(12) United States Patent
Downey

(10) Patent No.: US 6,273,507 B1
(45) Date of Patent: Aug. 14, 2001

(54) VERTICAL SEAT ADJUSTMENT ASSEMBLY WITH EXTERNAL STOPS

(75) Inventor: Hugh D. Downey, Barrie (CA)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/428,938

(22) Filed: Oct. 28, 1999

(51) Int. Cl.[7] .................................................. A47C 1/02
(52) U.S. Cl. ............................ 297/344.15; 297/344.13; 248/419
(58) Field of Search .................... 297/344.15, 330, 297/344.12, 344.13, 344.17, 344.2; 248/420, 419, 421, 429

(56) References Cited

U.S. PATENT DOCUMENTS

| | | | |
|---|---|---|---|
| 5,462,337 | * 10/1995 | Yamakami | 297/344.13 |
| 5,697,674 | * 12/1997 | Aufrere et al. | 297/344.15 |
| 5,738,327 | * 4/1998 | Tanaka et al. | 248/419 |
| 5,871,195 | * 2/1999 | Gauger | 248/419 |
| 5,924,668 | * 7/1999 | Garrido | 248/419 |
| 6,095,475 | * 8/2000 | Willms et al. | 297/344.15 X |
| 6,145,914 | * 11/2000 | Downey et al. | 248/429 X |
| 6,179,265 | * 1/2001 | Downey et al. | 248/419 X |

* cited by examiner

Primary Examiner—Laurie K. Cranmer
(74) Attorney, Agent, or Firm—Porter, Wright, Morris & Arthur LLP

(57) ABSTRACT

An adjustment assembly for adjusting the height of a vehicle seat includes an inboard track assembly, an outboard track assembly spaced apart from the inboard track assembly, and at least one torque tube extending between the assemblies. The inboard and outboard track assemblies each have a first track fixed to a vehicle structure and a second track supported for longitudinal movement with respect to the first track to adjust horizontal seat position. A seat bottom mounted for horizontal movement with the second track. The torque tube is interconnected to the seat member by a linkage assembly to move the seat member between a lowered position and a raised position. An actuator is selectively actuated to supply rotational input to the torque tube. As the torque tube rotates, the linkage assembly moves the seat bottom in a vertical direction. The adjustment assembly includes at least one stop supported on one of the inboard or outboard track assemblies. A link member, controlled by movement of the torque tube, engages the stop to define maximum raised and lowered seat bottom positions.

18 Claims, 3 Drawing Sheets

VERTICAL SEAT ADJUSTMENT ASSEMBLY WITH EXTERNAL STOPS

BACKGROUND OF THE INVENTION

This application relates generally to a power or manual seat adjustment assembly for adjusting the height of a seat within a vehicle. More particularly, this invention relates to a vertical seat adjuster having a torque tube and linkage assembly for engaging a stop to move the seat between maximum lowered and raised positions.

Seat adjustment assemblies for adjusting seat position within a vehicle are generally well known. Most arrangements provide for a seat to be moved or adjusted in forward and rearward directions within a vehicle. In many circumstances, it is desirable to have a seat adjustment assembly that can vertically move a seat between lowered and raised positions. Such an arrangement is necessary, for example, to accommodate vehicle drivers that are of varying heights. These seat adjusters can be manually/mechanically controlled or can be electrically controlled.

Electrically controlled adjustment assemblies typically include a vertical drive mechanism that includes a motor, a spindle or threaded drive shaft, a drive nut, and a drive link connecting the shaft to a torque tube. The motor drives the nut to move the shaft, and the drive link takes the linear movement of the shaft and provides rotational input to the torque tube. A linkage assembly is used to connect the torque tube to a seat bottom, and as the torque tube rotates, the linkage assembly causes the seat bottom to move vertically.

The seat bottom travels between two extreme positions, a maximum lowered position and a maximum raised position. The total vertical distance of travel between these two positions can vary depending on design requirements. However, in order to ensure maximum operating efficiency for the vertical drive mechanism, it is preferable to have the drive shaft and the drive link at a ninety degree angle with respect to each other when the seat bottom is at a mid-adjustment position, i.e. at a distance half-way between the maximum lowered and raised positions. In order to maintain this same orientation for seats having different total vertical travel distances, the length of the drive shaft is changed. This is expensive because it causes proliferation of parts.

Sometimes, a collar or sleeve is placed on the shaft to limit vertical travel distance. This allows the same shaft to be used for seats having different total vertical travel distances. The collar or sleeve is simply positioned at a location on the drive shaft that corresponds to the maximum desired vertical travel distance. The disadvantage with this configuration is that the drive shaft and drive link are not always maintained at a ninety degree angle with respect to each other at the mid-adjusted position. Thus, it is desirable to have a vertical adjustment mechanism that can utilize a single drive shaft for seats having different total vertical travel distances that maintain a ninety degree relationship between the shaft and the drive link at the mid-adjust position.

Sometimes a nut and spring washer are mounted on the drive shaft to serve as a stop to define the maximum raised and lowered positions. One disadvantage with this configuration is that the nut over-tightens at the maximum adjusted positions. This can cause what is know as lock-up or a sticking condition, which makes it more difficult to move from the maximum adjusted position to another vertical seat position. Thus, it is desirable to have vertical adjustment mechanism that eliminates lock-up and sticking during adjustment. The mechanism should also reduce the number of required parts, improve ease of assembly, and maintain or improve the operating efficiency of the drive system.

SUMMARY OF THE INVENTION

In general terms, this invention is a vertical seat adjustment assembly utilizing an external stop limit movement of a seat bottom between a maximum lowered position and a maximum raised position. Separate adjustment assemblies can be installed at the front and rear portions of the seat for adjusting the height of the front portion independently from the rear portion. Alternatively, a single adjustment assembly can be used to adjust the height of either the front or rear portion where the adjustment assembly includes a connecting linkage assembly to correspondingly adjust the height of the other portion of the seat bottom. The adjustment assembly utilizes a link member controlled by movement of a torque tube to engage the stop.

In a preferred embodiment of this invention, the adjustment assembly for adjusting the height of a vehicle seat includes a first mount, a second mount spaced apart from the first mount, and a torque tube extending between the first and second mounts to define a pivot axis. The first and second mounts support a seat member that is movable between a lowered position and a raised position. An actuator selectively supplies rotational input to the torque tube to move the seat member. A stop is supported by one of the mounts and at least one link member receives input from the torque tube and has an engagement portion for engaging the stop to define a maximum raised position and an engagement portion for engaging the stop to define a maximum lowered position.

The adjustment assembly is preferably used in a vehicle seat with power/electrical actuators, however, manual or mechanical actuation could also be used. Preferably the adjustment assemblies is used in a seat having an inboard track assembly mounted to a vehicle structure and an outboard track assembly mounted to a vehicle structure and spaced laterally from the inboard track assembly. The inboard and outboard track assemblies each include a first track and a second track supported for longitudinal movement relative to the first track. A seat bottom is supported on the second track for movement therewith. A horizontal drive mechanism includes a first motor for controlling movement of the second track with respect to the first track. At least one torque tube extends between the inboard and outboard track assemblies and is connected to the seat bottom by a linkage assembly to move the seat bottom between a lowered position and a raised position. A vertical drive mechanism includes a second motor for controlling movement of the torque tube. The link member rotates with the torque tube to engage the stop at the maximum raised and lowered positions.

The subject invention offers several advantages over prior art adjustment systems because it provides a simplified assembly for adjusting the vertical position of a seat within a vehicle that is durable, easy to assemble, quiet in operation, and eliminates lock-up and sticking.

These and other features and advantages of the present invention will be best understood from the following specification and drawings, the following of which is a brief description.

DETAILED DESCRIPTION OF THE PREFERRED EMBODIMENT

Figure 1:
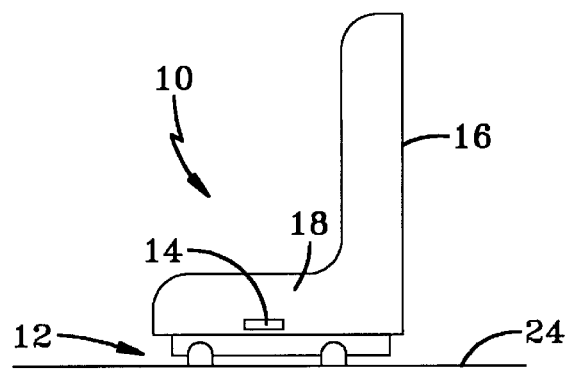
FIG. 1 is a side view of a seat with the subject adjustment assembly shown schematically.
Figure 2:
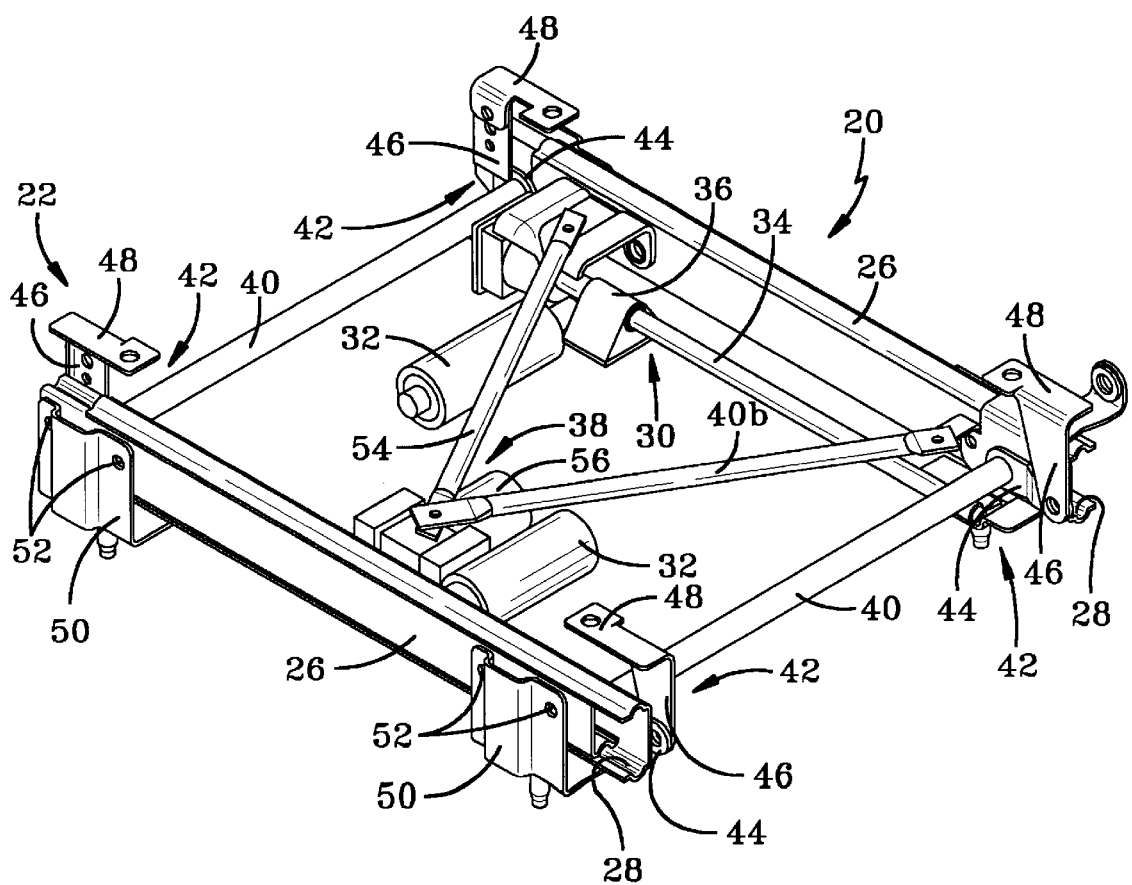
FIG. 2 is perspective view of the seat adjustment assembly.

FIG. 1 illustrates a vehicle seat assembly 10 that is vertically moveable between a lowered position and a raised position to accommodate drivers of varying heights. An adjustment assembly 12, shown schematically in FIG. 1, is used to move the seat assembly 10 between the lowered and raised positions. The adjustment assembly 12 is preferably actuated via a control panel 14 mounted to a side of the seat assembly 10. The control panel 14 could also be mounted to a vehicle dash or center console member. When the control panel 14 is activated by a seat occupant an electrical signal is sent to a driving mechanism, which causes the adjustment assembly 12 to move the seat to a desired position. The seat includes a seat back 16 supported relative to a seat bottom 18. The control panel 14 can be used to adjust the horizontal position, vertical position, or reclined position of the seat 10. The control panel 14 is electrically connected to the adjustment mechanism 12 as is well known in the art.

While electrical control is preferred, it should be understood that the subject invention could also be incorporated into a manually actuated mechanical mechanism. In a manual configuration, a handle or towel bar is operated by a seat occupant to adjust the horizontal and/or vertical positions of the seat 10.

The seat assembly 10 is preferably supported on an inboard track assembly 20 and an outboard track assembly 22 that are mounted to a vehicle structure 24, such as a vehicle floor, for example. The inboard 20 and outboard 22 track assemblies each include a first track 26 that is mounted to the vehicle structure 24 and a second track 28 that is movably mounted to the first track 26. Preferably, a plurality of bearing members (not shown) are inserted between the tracks 26, 28 to allow the second track 28 to slide longitudinally with respect to the first track 26.

The seat adjustment assembly 12 includes a horizontal driving apparatus, shown generally at 30, that is used to move the second track 28 relative to the first track 26. Any horizontal driving apparatus 30 known in the art can be used. Preferably, the horizontal drive apparatus includes a motor 32, a threaded drive shaft 34, and a drive nut 36. The drive shaft 34 and motor 32 are mounted for movement with the second track 28 and the drive nut 36 is fixed to the stationary first track 26. When the motor 32 receives the signal from the control panel 14, the drive shaft 34 is rotated with respect to the drive nut 36, causing the second track 28 to move relative to the first track 26. A single motor 32 can be used to adjust the second tracks 28 of both the inboard 20 and outboard 22 track assemblies or two (2) motors 32 can be used, one for each track assembly 20, 22. Thus, the seat assembly 10 can be moved in fore and aft directions via the inboard 20 and outboard 24 track assemblies to adjust the horizontal position of the seat assembly 10 with respect to vehicle control pedals (not shown) and/or a vehicle steering wheel or dash.

The seat adjustment assembly 12 also includes a vertical drive apparatus, shown generally at 38, that is used to vertically move the seat bottom 18 between a maximum raised and a maximum lowered position. While the vertical drive apparatus 38 is preferably used in combination with a horizontal drive apparatus 30, it should be understood that the vertical drive apparatus 38 could also be used in a seat 10 that does not include a horizontal adjustment feature.

Torque tubes 40 extend between the inboard 20 and outboard 22 track assemblies. Preferably, one torque tube 40 is positioned near the forward portion of the seat and one torque tube 40 is positioned near the rearward portion of the seat 10. The torque tubes 40 are connected to the seat bottom 18 by a linkage assembly 42. The linkage assembly 42 preferably includes at least a first link 44 that is fixed for rotation with the torque tube 40 and a second link 46 that is attached to a seat bottom member or seat pan by a bracket portion 48. The torque tubes 40 receive rotational input from the vertical drive apparatus 38 to cause the linkage assembly 42 to move the seat bottom 18.

Brackets 50 and fasteners 52 are used to attach the first tracks 26 to the vehicle structure 24 as is known in the art. Structural members 54 extend between the inboard 20 and outboard 22 track assemblies to increase seat stability.

Figure 3:
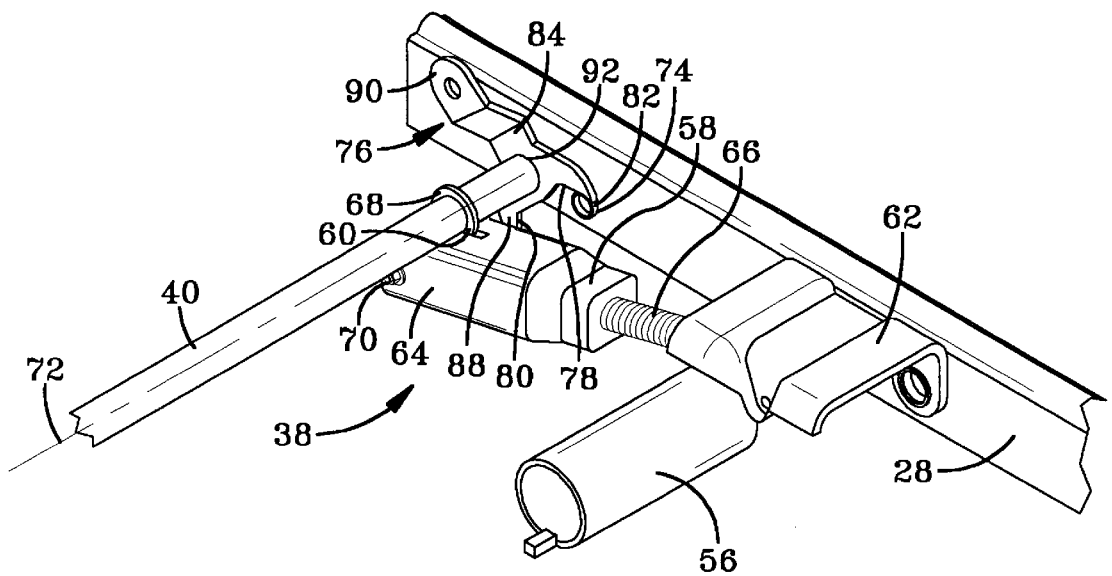
FIG. 3 is an enlarged perspective view, partially broken away, of the assembly of FIG. 2 in the maximum raised position.

As shown in FIG. 3, the vertical drive apparatus 38 preferably includes a motor 56, vertical driver 58, and a vertical drive link 60. The motor 56 is preferably attached to the second track 28 of one of the inboard 20 or outboard 22 track assemblies with a bracket 62. The vertical driver 58 preferably includes a main body 64 and a threaded drive spindle 66 that is driven by said motor 56 to move relative to said body 64. One end 68 of the vertical drive link 60 is fixed for rotation with the torque tube 40 while an opposite end 70 is pivotally connected to the vertical driver 58. While the vertical drive apparatus shown in FIG. 3 is preferred, it should be understood that the subject invention could be utilized with any vertical drive apparatus known in the art.

To adjust the vertical position of the seat 10, a seat occupant activates the control panel 14, which sends an activation signal to the motor 56. As the motor 56 rotates the spindle 66, the body 64 is moved linearly with respect to the spindle 66, which causes the drive link 60 to pivot about a pivot axis 72 defined by the torque tube 40. As the drive link 60 pivots, the torque tube 40 is forced to rotate about the pivot axis 72, causing the linkage assembly 42 to vertically adjust seat position.

The adjustment assembly 12 includes at least one stop 74 supported by one of inboard 20 or outboard 22 track assemblies. The stop 74 preferably extends outwardly from the second track 28. The stop 74 can be comprised of an extrusion, a tab, or a fastener. An engagement member 76 controlled by the torque tube 40 interacts with the stop 74 to define maximum and minimum vertical adjustment positions for the seat 10. The engagement member 76 is preferably a link member fixed for rotation with the torque tube 40 and includes a first engagement portion 78 for engaging the stop 74 to define the maximum raised position and a second engagement portion 80 for engaging the stop 74 to define a maximum lowered position.

It should be understood that the stop 74 is preferably comprised of a single extrusion, tab, or fastener, however, two (2) or more extrusions, tabs or fasteners could be used to define the maximum adjustment positions. Further, while the engagement member 76 is preferably a single link member, it should be understood that the engagement member could be comprised of more than one link. For example, two (2) links could be mounted for rotation with the torque tube 40 with one of the links engaging the stop 74 at the maximum raised position and the other of the links engaging the stop 74 at the maximum lowered position. Or optionally, the engagement member 76 could be comprised of a linkage assembly having two (2) or more links interconnecting the torque tube 40 to a member having the first 78 and second 80 engagement portions.

Preferably, as shown in FIG. 3, the stop 74 is an extrusion that extends outwardly from one of the second tracks 28 to present an engagement surface 82 for interacting with the first 78 and second 80 engagement portions. As discussed above, the engagement member 76 is preferably a single slave link 84 that includes a first arm 86 extending out radially from the torque tube 40 and presenting the first engagement portion 78 and a second arm 88 extending out radially from the torque tube 40 and presenting the second engagement portion 80. The link 84 has a central aperture 92 for receiving the torque tube 40 such that the link 84 is fixed for rotation with the torque tube 40. The first 86 and second 88 arms are spaced apart from one another and extend out radially from the torque tube 40 in different directions. The stop 74 is positioned between the arms 86, 88 such that a single stop 74 can be used to define both maximum lowered and raised positions.

The link 84 includes a third arm 90 extending out radially from the torque tube 40 in a direction different that the first 86 and second 88 arms. Preferably, the third arm 90 is used to interconnect the torque tube 40 and the seat frame or seat pan member. Thus, the link 84 is preferably a Y-shaped link with a first obtuse angle formed between the first 86 and third 90 arms and a second obtuse angle formed between the second 88 and third 90 arms. The angle formed between the first 86 and second 90 arms can be either an acute angle, an obtuse angle, or a right-angle depending on what the total vertical travel distance requirement is. Thus, the position of the first 86 and second 88 arms can be adjusted relative to one another to cover various different vertical travel distance requirements.

Figure 4:
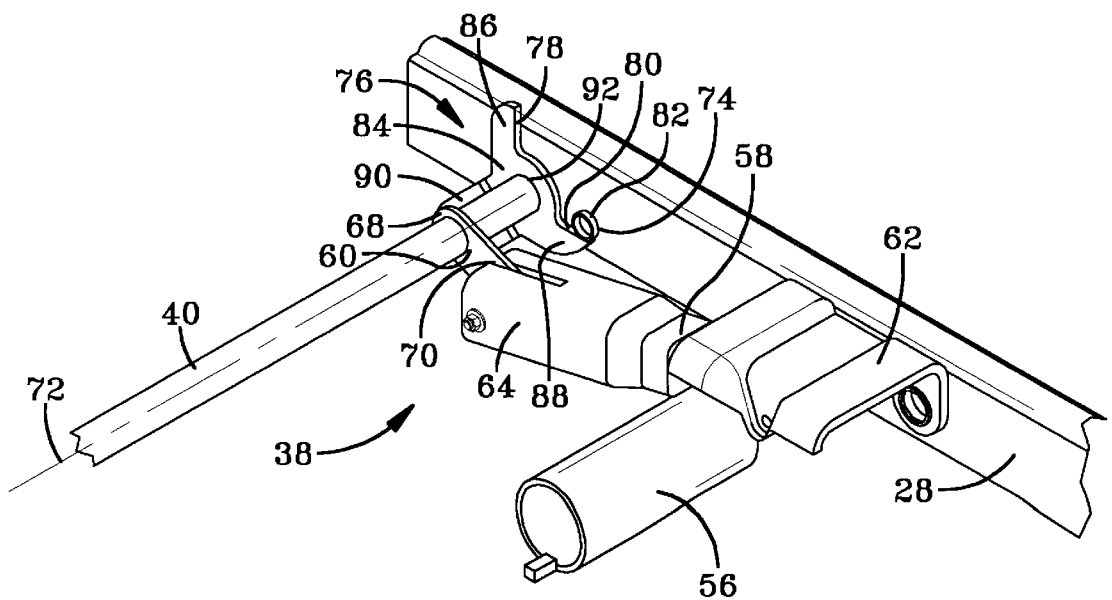
FIG. 4 is an enlarged perspective view, partially broken away, of the assembly of FIG. 2 in the maximum lowered position.

As shown in FIG. 3, the stop 74 extends outward from the second track 28 and is located between the first 86 and second 88 arms such that when the first arm 86 engages the stop the seat is in the maximum raised position. When the second arm 88 engages the stop 74 the seat is in the maximum lowered position, as shown in FIG. 4. The stop 74, the torque tube 40, and link 84 are all fixed for movement with the second track 28 such that the interaction between the link 84 and stop 74 can occur at any adjusted horizontal position.

Figure 5:
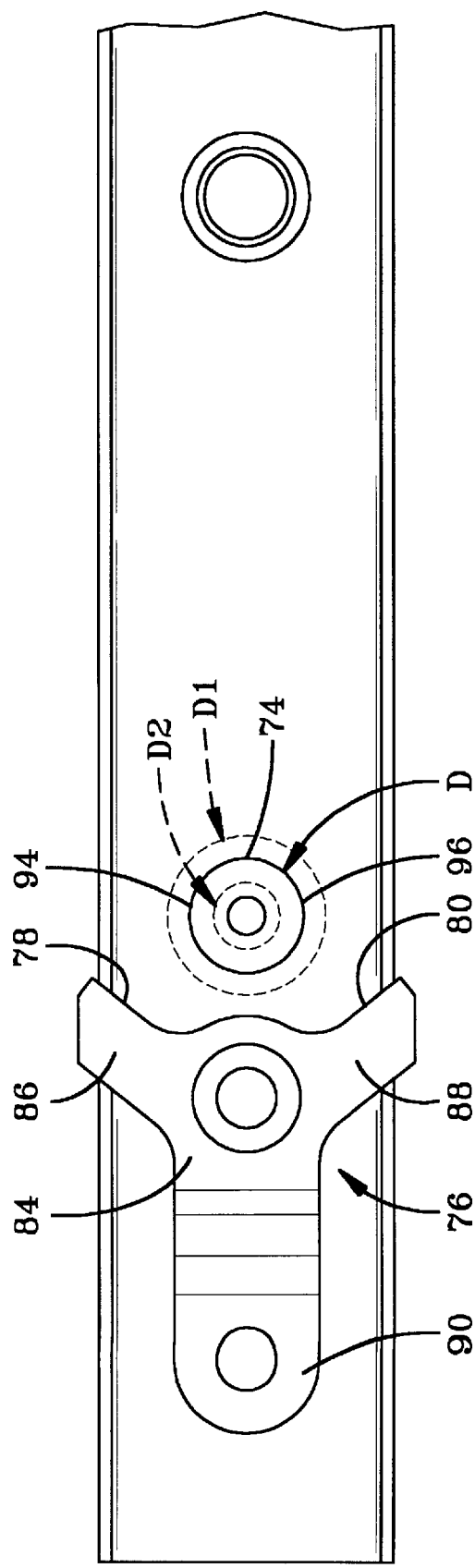
FIG. 5 is a side view, partially broken away, of the adjustment assembly of FIG. 2 in a mid-adjustment position.

As shown in FIG. 5, the stop 74 is positioned half-way between the first 86 and second 88 arms when the seat 10 is at a mid-adjusted position (half-way between the maximum raised and lowered positions). At this orientation, the drive link 60 and vertical driver 58/spindle 66 are at ninety degrees with respect to each other. The stop 74 is preferably formed as a circular extrusion extending outwardly from the second track 28 to present an upper engagement surface 94 for interacting with the first engagement portion 78 to define the maximum raised position and a lower engagement surface 96 for interacting with the second engagement portion 80 to define the maximum lowered position. The extrusion is formed on the second track 28 adjacent to the insertion point for the torque tube 40. The extrusion is preferably formed from the same material as the tracks 26, 28, such as steel or aluminum.

As discussed above, the engagement portions 78, 80 of the first 86 and second 88 arms can be moved closer together or further apart to respectively reduce or increase the total vertical travel distance for the seat 10. This can be done by machining or trimming material off from the arms 86, 88 until the arms 86, 88 are spaced from one another at the desired distance. Another option would be to increase the diameter D of the circular extrusion to control the total vertical travel distance. A larger diameter D1 extrusion would decrease the amount of vertical travel while a smaller diameter D2 extrusion would increase the amount of vertical travel. The diameter of the extrusion can be controlled at manufacture by using an appropriately sized tool.

The advantage of both of these options is that the vertical driver 58 and drive link 60 are always maintained at a ninety degree relationship at the mid-adjust position. This results in maximum operating efficiency for the motor 56. Also, if either option is used, the same vertical driver 58 and spindle 66 can be used for the seat adjustment assembly 12 regardless of the vertical travel distance requirements. The adjustment assembly 12 also uses the same link 84 and stop 74 regardless of the vertical travel distance requirements. The arms 86, 88 of the link are simply machined such that they are located at the specified distance apart from one another, and the extrusion is simply formed to the specified size.

The use of the link 84 and stop 74 also eliminates lock-up and sticking. As the either of the arms 86, 88 engage the stop 74 the reaction forces are perpendicular to each other. The forces are equal and opposite to each other, as indicated by the opposing arrows in FIGS. 3 and 4, which prevents the seat 10 from being stuck or locked in the maximum raised or lowered condition.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An adjustment assembly for adjusting the height of a vehicle seat comprising:
   a first mount;
   a second mount spaced apart from said first mount, said first and second mounts for supporting a seat member that is movable between a lowered position and a raised position;
   a torque tube extending between said first and second mounts and defining a pivot axis;
   an actuator for selectively supplying rotational input to said torque tube;
   a stop supported by one of said mounts; and
   at least one link member receiving input from said torque tube and having a first engagement portion for engaging said stop to define a maximum raised position and a second engagement portion for engaging said stop to define a maximum lowered position.

2. An assembly as recited in claim 1 wherein said stop is an extrusion extending outwardly from one of said mounts to present an engagement surface for interacting with said first and second engagement portions.

3. An assembly as recited in claim 1 wherein said actuator is comprised of an electric motor mounted to one of said mounts and a vertical driver interconnecting said motor and said torque tube, said motor providing input to said vertical driver causing said torque tube to rotate.

4. An assembly as recited in claim 3 including a drive link having one end fixed for rotation with said torque tube and an opposite end pivotally connected to said vertical driver.

5. An assembly as recited in claim 1 wherein said at least one link member is comprised of a single link mounted on said torque tube for rotation therewith about said pivot axis.

6. An assembly as recited in claim 5 wherein said single link includes a first arm extending out radially from said torque tube and presenting said first engagement portion and a second arm extending out radially from said torque tube and presenting said second engagement portion.

7. An assembly as recited in claim 6 wherein said stop is positioned between said first and second arms.

8. An assembly as recited in claim 7 wherein said stop is a circular extrusion extending outwardly from one of said mounts to present an upper engagement surface for interacting with said first engagement portion to define said maximum raised position and a lower engagement surface for interacting with said second engagement portion to define said maximum lowered position.

9. An adjustment assembly for adjusting the height of a vehicle seat comprising:

an inboard track assembly;

an outboard track assembly spaced apart from said inboard track assembly, said inboard and outboard track assemblies each having a first track fixed to a vehicle structure and a second track supported for longitudinal movement with respect to said first track to adjust horizontal seat position, a seat member supported for horizontal movement with said second track;

at least one torque tube extending between said inboard and outboard track assemblies wherein said torque tube is interconnected to said seat member to move said seat member between a lowered position and a raised position;

an actuator for selectively supplying rotational input to said torque tube;

at least one stop supported on one of said inboard or outboard track assemblies; and a link supported on one end of said torque tube for rotation therewith, said link for engaging said stop to define maximum raised and lowered positions.

10. An assembly as recited in claim 9 wherein said link includes a first arm extending out radially from said torque tube in a first direction and a second arm extending out radially from said torque tube in a second direction, said first arm engaging said stop to define said maximum raised position and said second arm engaging said stop to define said maximum lowered position.

11. An assembly as recited in claim 10 wherein said link includes a third arm extending out radially from said torque tube in a third direction, said third arm for interconnecting said torque tube and said seat member.

12. An assembly as recited in claim 11 wherein said link is a Y-shaped link such that a first obtuse angle is formed between said first and third arms and a second obtuse angle is formed between said second and third arms.

13. An assembly as recited in claim 10 wherein said stop extends outward from one of said second tracks and is located between said first and second arms such that when said first arm engages said stop said seat member is in said maximum raised position and when said second arm engages said stop said seat member is in said maximum lowered position.

14. A vehicle seat assembly comprising:

a seat bottom;

an inboard track assembly mounted to a vehicle structure;

an outboard track assembly mounted to a vehicle structure and spaced laterally from said inboard track assembly, said inboard and outboard track assemblies each including a first track and a second track supported for longitudinal movement relative to said first track, said seat bottom being supported on said second track for movement therewith;

a horizontal drive mechanism including a first motor for controlling movement of said second track with respect to said first track;

at least one torque tube extending between said inboard and outboard track assemblies wherein said torque tube is interconnected to said seat bottom by a linkage assembly to move said seat bottom between a lowered position and a raised position;

a vertical drive mechanism including a second motor for controlling movement of said torque tube;

at least one stop supported on said inboard or outboard track assemblies; and an engagement member supported for movement with said torque tube wherein said engagement member interacts with said stop to define maximum raised and lowered positions.

15. An assembly as recited in claim 14 wherein said stop is fixed for movement with said second track.

16. An assembly as recited in claim 15 wherein said engagement member is a slave link having a central aperture for receiving said torque tube, said slave link being fixed for rotation with said torque tube.

17. An assembly as recited in claim 16 wherein said stop is comprised of at least one tab extending outwardly from said second track adjacent to said torque tube.

18. An assembly as recited in claim 16 wherein said slave link includes a first arm for engaging said tab when said seat bottom is moved to said maximum raised position and a second arm for engaging said tab when said seat bottom is moved to said maximum lowered position.

* * * * *